United States Patent
Beckstrom (10) Patent No.: US 6,854,546 B2
(45) Date of Patent: Feb. 15, 2005

(54) AUXILIARY CAB LIFT SPRING

(75) Inventor: Harold K. Beckstrom, Lisbon, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 130 days.

(21) Appl. No.: 10/233,688

(22) Filed: Sep. 3, 2002

(65) Prior Publication Data

US 2004/0040762 A1 Mar. 4, 2004

(51) Int. Cl.$^7$ .............................................. B62D 33/06
(52) U.S. Cl. .................................................. 180/89.13
(58) Field of Search .......................... 180/89.13, 89.14; 296/190.01, 190.04, 190.05

(56) References Cited

U.S. PATENT DOCUMENTS

| | | | |
|---|---|---|---|
| 2,326,594 A | | 8/1943 | Wood ........................... 298/22 |
| 2,449,202 A | | 9/1948 | Day ............................. 298/22 |
| 2,476,694 A | | 7/1949 | Bourne-Vanneck ........... 298/22 |
| 3,797,883 A | * | 3/1974 | Steiner et al. ............ 180/89.14 |
| 3,831,999 A | | 8/1974 | Sonneborn ................ 296/35 R |
| 3,853,368 A | | 12/1974 | Eichelsheim ............... 296/35 R |
| 4,050,259 A | * | 9/1977 | Childress ..................... 405/293 |
| 4,253,700 A | * | 3/1981 | Di Francescantonio 296/190.05 |
| 4,401,179 A | | 8/1983 | Anderson ................. 180/89.14 |
| 4,408,672 A | | 10/1983 | Albright et al. .......... 180/89.14 |
| 4,493,386 A | | 1/1985 | Sonneborn ................ 180/89.15 |
| 4,811,983 A | | 3/1989 | Watts et al. ................. 296/190 |
| 5,839,278 A | | 11/1998 | Sonneborn ..................... 60/403 |
| 5,918,694 A | * | 7/1999 | Miller et al. ............. 180/89.14 |
| 6,068,074 A | | 5/2000 | Sonneborn et al. ...... 180/89.14 |
| 6,102,471 A | | 8/2000 | Sasser et al. .......... 296/190.05 |

OTHER PUBLICATIONS

Figure 13—Operator Cab Publication Date prior to Jan. 2001.
Drawing for Gas Spring Mount Publication Date prior to 2001.

* cited by examiner

Primary Examiner—Faye M. Fleming
(74) Attorney, Agent, or Firm—Westman, Champlin & Kelly, P.A.

(57) ABSTRACT

A power machine having a frame and a cab rotatably coupled to the frame at a pivot axis for movement from a working position to a raised position. A first spring and a second spring both extendable from a first length to a second longer length are connected to the frame at opposite sides of the cab to assist in moving the cab from its working position. A third spring is connected to one of the sides of the cab, and is also extendable from a first length to a second longer length. The third spring is coupled to the frame and the cab, and provides an additional assisting force as the cab initially starts pivoting and becomes ineffective as the cab nears its raised position.

9 Claims, 6 Drawing Sheets

AUXILIARY CAB LIFT SPRING

BACKGROUND OF THE INVENTION

The present invention generally relates to adding assisting force for the tilting a cab for power machines for access to components under the cab. In particular, the present invention relates to a multiple spring system assisting in the tilting of a rear pivoting cab on a power machine.

Power machines, such as skid steer loaders, often have a cab which covers an operator compartment. Many times this cab is a rear pivoting cab which gives the access to components requiring service under the operator compartment. Rear pivoting cabs, because of the materials used, are often heavy and the pivot position results in a large moment being generated when the cab is in closed position.

To assist the operator in opening and closing the cab rear pivoting cabs use a pair of gas springs one on each side of the cab to reduce the manual force required to tilt the cab. It has been undesirable to merely use larger or stronger springs to assist in opening the cab, because of size limitations on the sides of the cab, and importantly as the cab tilts, the center of gravity of the weight actually goes over center. That is, the center of gravity of the cab moves behind a vertical plane passing through the axis of pivot or rotation. The additional force of a large spring then exerts a high force which holds the cab tilted up with a large force and the operator must counter the spring force to initiate returning the cab to its usable position.

The gas springs usually are mounted close to the pivot of the cab to reduce the length of the spring when gas springs are too long, they are unstable.

SUMMARY OF THE INVENTION

The present invention to provide an auxiliary spring or force generator that assists two conventional gas springs for initially lifting the cab from its lowered or usable position where the moments are high and relates to a power machine having a frame, and an operator's compartment and cab rotatably coupled to the frame at a pivot axis and under an existing force. The auxiliary spring is mounted to become ineffective as the cab approaches its raised position.

The conventional gas springs are on opposite sides of the cab, and provide force as they extend from a first length to a second longer length. At least one auxiliary spring providing an extension force is connected to the cab, and also provides a force as it extends from a first length to a second longer (and fixed) length. The auxiliary spring is coupled to the frame and the cab with a "lost motion" connection so once it extends to its second (maximum) length, it will slide in its linkage and not provide any force on the cab while the conventional springs are still exerting a lifting force.

The auxiliary spring reaches its maximum working length before the cab is fully tilted to its open position. The lost motion link then slides so the auxiliary spring does not load the cab, nor does it restrain the pivoting while the conventional springs continue to provide force to aid in opening the cab. The opening continues until the center of gravity of the cab goes over center. When the cab reaches or approaches the "on center" position, the prior art conventional springs reach their maximum length and have short lost motion slots so the cab is not assisted between the "on center" position to its full open position.

The short lost motion slots of the conventional springs will permit the cab to rotate only slightly beyond the over center position before stopping the cab from continued pivoting under gravity.

DETAILED DESCRIPTION OF THE ILLUSTRATIVE EMBODIMENTS

The present invention is described with respect to the loader for illustrative purposes but the auxiliary spring for assisting initial lifting of the pivoting cab can be used with many different power machines.

Figure 1:
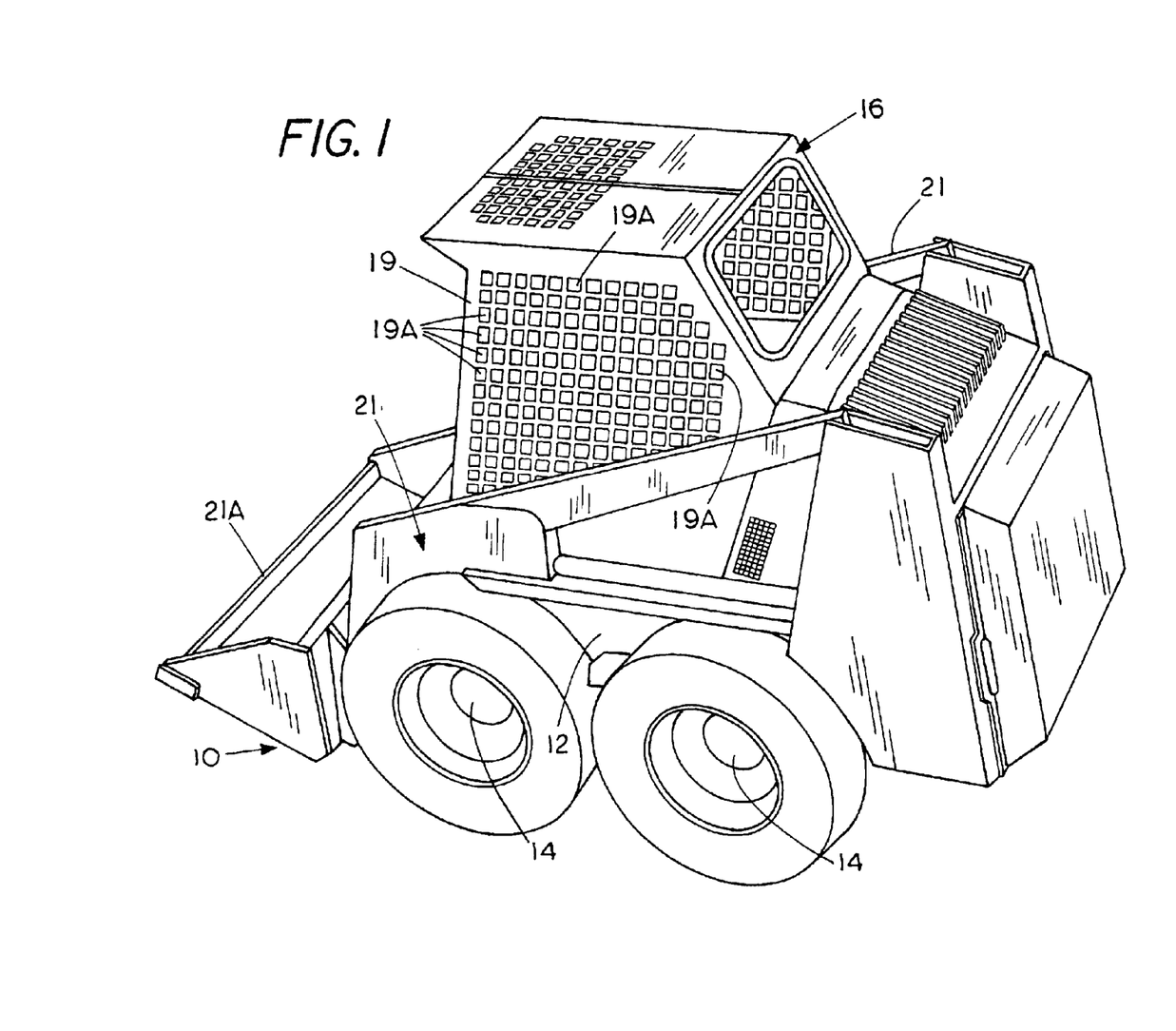
FIG. 1 is a side elevational view of a skid steer loader.

FIG. 1 is a side elevational view of skid steer loader 10 having a pivoting cab with an auxiliary assisting lift springs of the present invention. Skid steer loader 10 includes a frame 12 supported by wheels 14. Frame 12 also supports an operator's compartment or cab 16 which substantially encloses a seat on which an operator sits to control skid steer loader 10. Cab 16 can take any shape desired but is pivotally mounted to the frame at the rear of the cab so it can be lifted for access to components below the cab 16. Lift arm 21 are pivotally coupled to a portion of the frame 12 and are on opposite sides of the cab 16. The lift arms support a bucket 21A as shown. The cab on skid steer loaders are generally provided with a front door for operator entry and side cab panels 19 have openings 19A for visibility, as shown.

Figure 2:
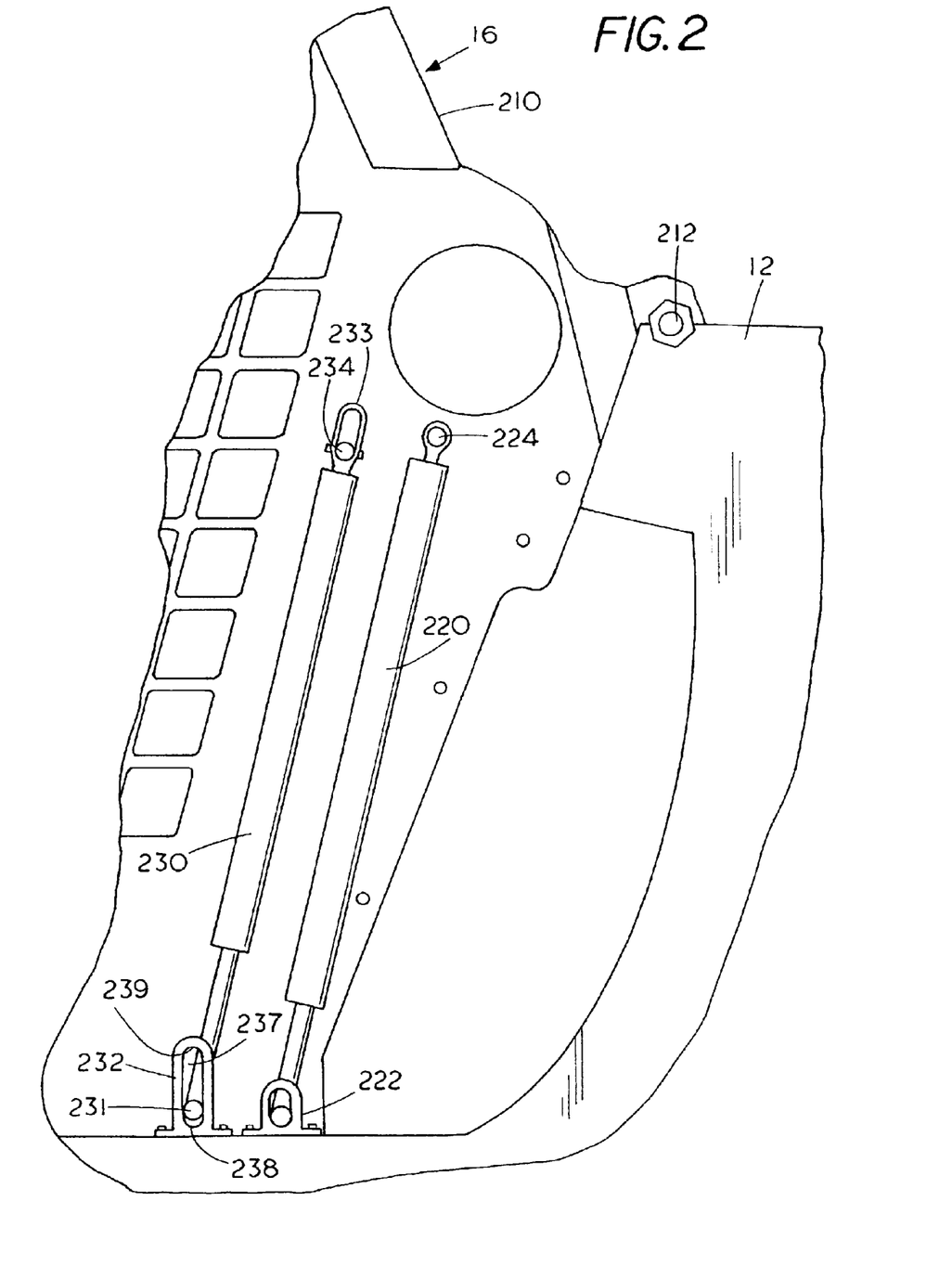
FIG. 2 is a fragmentary side view of the left-hand side of a skid steer loader with a cab made in accordance with one illustrative embodiment of the present invention.

FIG. 2 is a fragmentary side view of the left-hand side of skid steer loader 10 with cab 16 in accordance with one illustrative embodiment of the present invention. Cab 16 comprises a cab frame 210 that has a operator front access opening and two side windows or panels 19 positioned on the left-hand and right-hand sides of the operator compartment, respectively. Cab frame 210 is connected to frame 12 of loader 10 on brackets at a pivot axis 212. Cab frame 210 rotates about pivot axis 212 during opening or lifting the cab 16 to allow access to service components for the loader that are below the cab.

In one illustrative embodiment windows shown at 214 in FIG. 4–7 comprise glass to protect the operator from the external environment during normal operations while allowing the operator to view the work site. However, other coverings may be used on windows 214 to protect the operator depending on the application, such as the steel panels 19 with punched openings 19A (FIGS. 1, 2 & 8), or heavy tubing, clear plastic or Plexiglas®.

Figure 8:
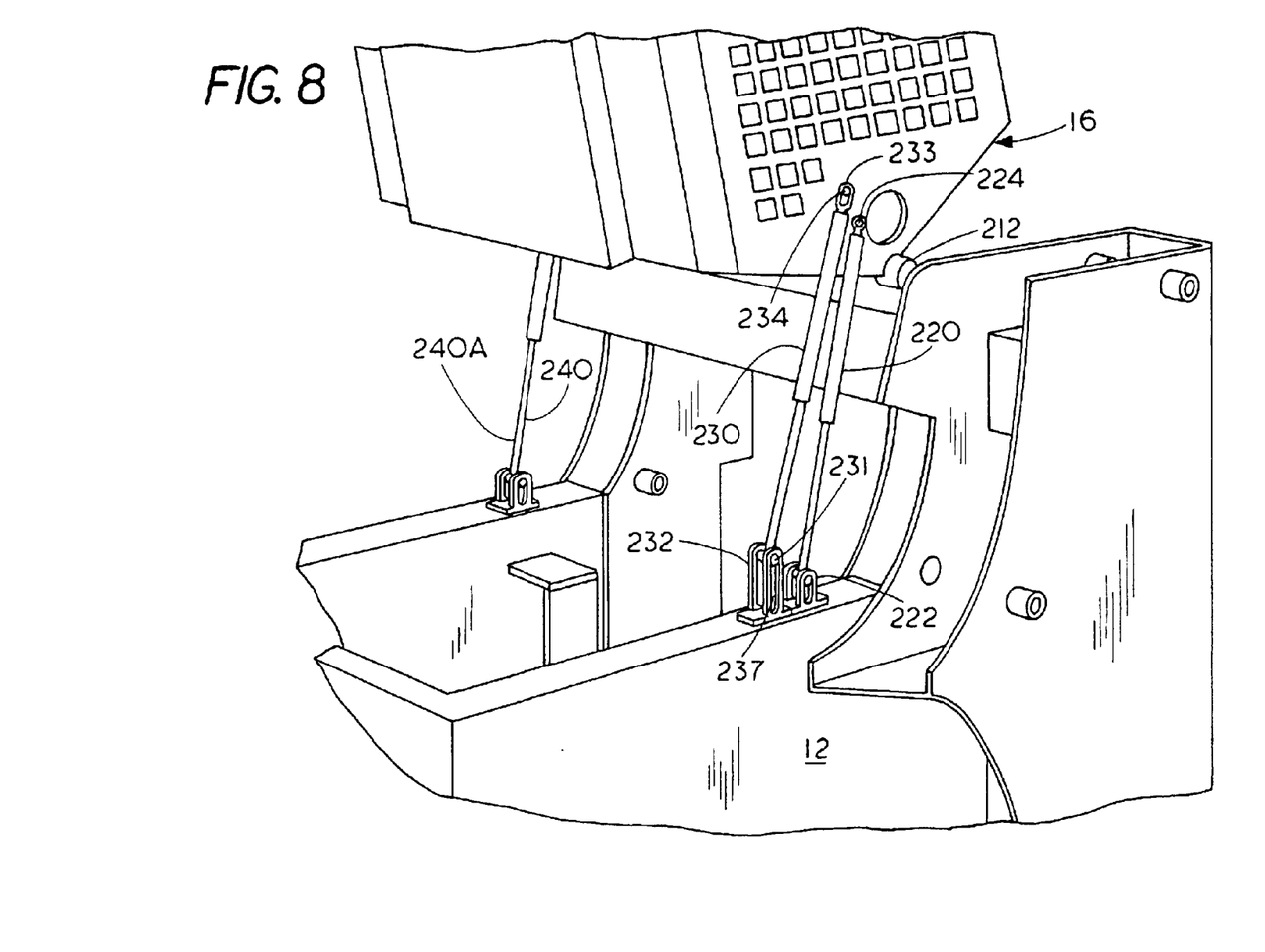
FIG. 8 is a schematic perspective view of the cab in a fully open position.

It can be seen that with a rear pivot mounting for the cab 16 as shown, when the cab is to be pivoted "open", the loading moment about the pivot axis caused by cab weight is at a maximum with the cab adjacent its closed or lowered operating position. In a conventional rear pivot cab two gas springs 220 and 240 are provided, as shown in FIG. 8, and they are connected between cab frame 210 and loader frame 12. Springs 220 and 240 are the standard pair of gas springs connected to cab frame 210, one of each side of the cab to provide force to counteract the loads when initially pivoting the cab from closed to open positions. Compression springs that have similar spring characteristics and maximum and minimum lengths can be used.

Gas springs are well known and have gas filled cylinders with an internal piston acted on by a gas under pressure, and a piston rod that extends from a compressed length to a maximum fixed length where the rod of the gas spring is fully extended. The springs 220 and 240 are compressed with the cab lowered and will provide a force to urge the cab to open position as the cab rotates about pivot axis 212 to open position.

Use of the two conventional gas springs has been found to not provide sufficient force when the cab is initially being pivoted upwardly from its closed position. The cabs have gotten heavier in recent years, with heavier enclosures and the addition of HVAC Systems. The cab 16 will pivot toward its open position about the pivot axis to a point where the center of gravity shown illustratively at 241 goes "over center", or over the pivot axis, as the cab pivots to its full open position. The cab is stopped by external stops in its over center open position, and can be locked in place.

As the cab pivots rearwardly toward its open position, the moment or force required to maintain the pivoting reduces substantially, and if the two springs that are active to provide a lifting force on the cab until the cab goes over center are made to be strong enough, or made to provide enough force to reduce the effort needed to initially pivot the cab to reasonable levels, the springs then provide such a high force level, even when extended, that returning the cab to its closed position from its open position is extremely difficult, if not impossible for an operator. The springs will resist the pivoting of the cab to its closed position when the moment exerted by the cab is low, that is, when the cab is near its on center, open position.

Thus, increasing the size of a existing springs is not the solution to providing an adequate assisting force for lifting the cab initially. The problem is not solved by making the two standard springs heavier or providing a greater force level.

It should also be noted, that the two springs 220 and 240 that are conventional for lifting the cab have short "lost motion" movement at the base brackets when the cab goes over center, after the conventional springs have reached their maximum extension. The cab can pivot about 95° from its closed or operating position to its open position. The center of gravity of the cab reaches on center or goes over center, that is, when the cab is open the center of gravity moves to an opposite side of a vertical plane passing through the pivot axis of the cab from the position of the center of the gravity within the cab closed. A mechanical stop prevents the cab from pivoting too far rearwardly and stops the cab after about 95° of pivoting. Otherwise gravity would continue to pivot the cab rearwardly.

In order to solve the problem of having an adequate assisting force when the cab is in its lowered or operating position, but yet not having a force when the cab is to be lowered that prevents the cab from being lowered easily, a third spring that is effective only during the initial portions of the pivoting movement of the cab from its closed to its open position is provided.

Spring 230 is thus provided as an auxiliary spring to assist the operator in opening cab 16 by providing an additional lifting force, in addition to the standard pair of springs, to counteract a portion of the weight of cab 16 during the initial, opening pivoting, and no additional assisting or restraining force as the center of gravity of the cab moves toward and past the over center position. All of the springs 220, 230, and 240 are compressed when cab frame 210 is closed, and provide a spring force in a direction of spring expansion that assists with the rotation of cab frame 210 about pivot axis 212.

Spring 230 is connected to the left-hand side of cab frame 210, as shown, but can be connected at either side. Two auxiliary springs, one on each side, that act to provide spring force only in a selected portion of cab pivoting can be provided. The spring 230 thus has two lost motion slots, which provide adequate lost motion or release travel, without having the base bracket get too long, and also keeping the spring 230 shorter.

Springs 220 and 240 are attached to loader frame 12 with pivot brackets 222. As shown schematically the brackets 222 have short slots that permit a pivot pin holding the end of the respective spring to slide upwardly a short distance after the springs 220 and 240 are at their maximum extension, which is right at or just after the center of gravity of the cab goes over center once that position is reached, the cab will continue to pivot rearwardly due to the over center condition and the force of gravity, and the springs 220 and 240 slide a short distance in their brackets to permit some additional pivoting until the cab is stopped.

In order to provide an assisting or auxiliary force during the initial pivoting one end of spring 230 is connected to the cab with a slotted end bracket 233 on the spring, that mounts over a pin 234 fixed to the cab. A pivot point is thus formed. The opposite end of the spring 230 is connected to the frame 12 with the bracket 232 that is a slotted, lost motion bracket and as stated, to the cab with the bracket 233 that is also a lost motion connection. The bracket 232 has an elongated slot 237 in which a pin 231, connected to the end of the gas spring 230, slides. Auxiliary gas spring 230 is thus mounted so that when the cab is in its lowered position as shown in FIG. 2, the pin 231 is at the bottom end 238 of the slot 237, and pin 234 is at the lower end of the slot in bracket 233. The spring is compressed to provide a force tending to rotate the cab to its open position. Spring 230 thus is providing an auxiliary force for pivoting in addition to that of the springs 220 and 240.

The amount of force being applied tending to pivot the cab is a function also of the spacing of the pivot points 224 and 234 from the axis 212, and this geometry as well as the spring characteristics can be selected so that the force generated by the gas springs is within the range desired, while keeping the springs and brackets short as the assembly is stable when extended.

The cab is lifted by an operator (after being unlatched), to pivot about the pivot axis 212. When the amount of pivoting is in the range of 70–75° from the closed or working position of the cab, (FIG. 5) the auxiliary spring 230 is fully extended, and will not extend any farther, as is known with gas springs.

The center of gravity of the cab is shown at a range of two positions 241A and 241B, which positions depend on the added cab equipment such as a door and the like. As the cab is pivoted the center of gravity 241A, 241B moves closer to the vertical plane passing through the pivot axis 212, as shown by the difference in position between FIGS. 4 and 5. The moment tending to pivot the cab 16 back to its closed position has reduced substantially at the position shown in FIG. 5 so that the two springs that are conventionally provided, namely springs 220 and 240, will provide a sufficient assisting force to permit an operator to continue to rotate the cab to its full open position (95° of pivoting). At the pivotal position of FIG. 5, the pin 231 will start to slide upwardly in the slot 237 and the pin 234 will also slide along the slot of bracket 233, so spring 230 will not provide any additional force that tends to rotate the cab to its open position. When the cab is rotated to its full open position of FIG. 7, spring 230 will not resist rotation of the cab toward its closed position, until the pin 231 reaches the lower end of the slot 237 and the pin 234 reaches the lower end of slot in bracket 233.

When the cab 16 is in its fully open position, the center of gravity 240 has moved to the rear side of the plane 243, or in another words has gone "over center" and the cab 16 will tend to continue to rotate in that direction, due to its own weight and the moment created. The springs 220 and 240 will slide in their short slots in their brackets a short distance to permit the cab to rotate freely rearwardly, the cab rotation is stopped by external stop members.

Conventionally, a latch or stop 240A is provided on the spring 240 to prevent the cab from being closed. The latch locks the cab in its open position, and prevents movement to a closed position unless the latch is manually released. This latch, again, is conventional, and various types of latches, locks, or props can be used.

When spring 230 is fully extended spring bracket end 231 releases from bottom end 238 of slot 237 and the pin 324 releases from the end of the slot in bracket 233 at a selected location in the cab pivotal cycle during the opening of cab 16. At this release point pin 231 is free to move in bracket slot 237 and pin 234 freely slides in bracket 233 as cab frame 210 is rotated farther toward its open position. Pin 231 then slides from bracket slot bottom end 238 to bracket slot top end 239 and pin 234 slides in bracket 233 as cab frame 210 rotates to its full open position.

When cab frame 210 is closed (after releasing stop 240A) pin 231 moves from bracket slot top end 239 and freely slides toward the slot bottom end 238 without resisting cab pivoting and pin 234 moves in bracket 233. The conventional springs provide counterbalance force until the pin 231 engages the end 239 of slot 237, and pin 324 engages the lower end of the slot in bracket 233, at which point auxiliary spring 230 again provides counterbalance force.

Figure 3:
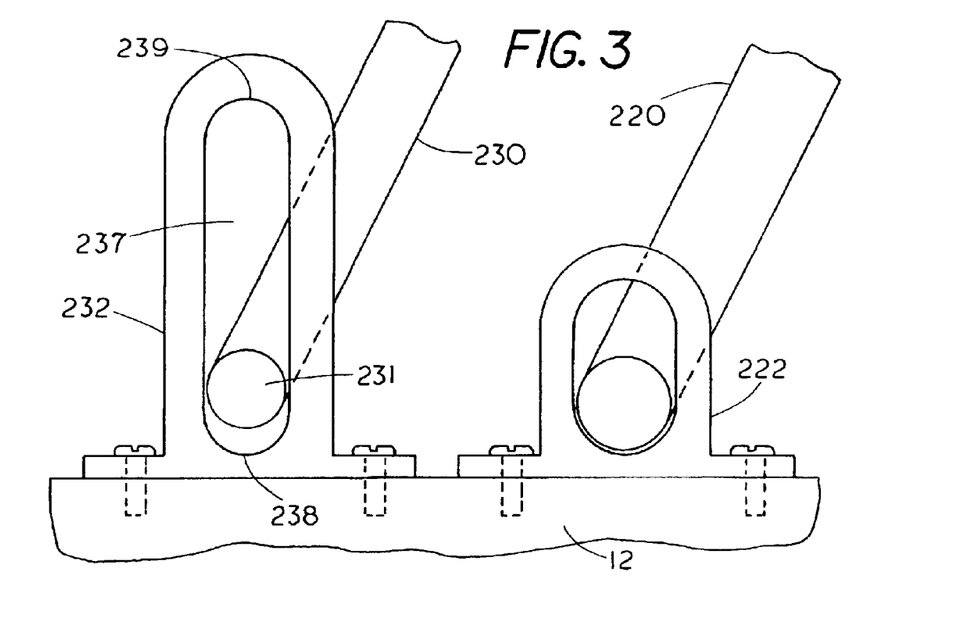
FIG. 3 is an enlarged schematic side view of the base mounting brackets of the skid steer loader shown in FIG. 2.

FIGS. 4–7 show the operation of springs 220, 230 and 240 during various points in the opening of cab 16 in accordance with the arrangement discussed above in connection with FIGS. 2 and 3. it should be noted that the movement of springs 220 and 240 is identical.

Figure 4:
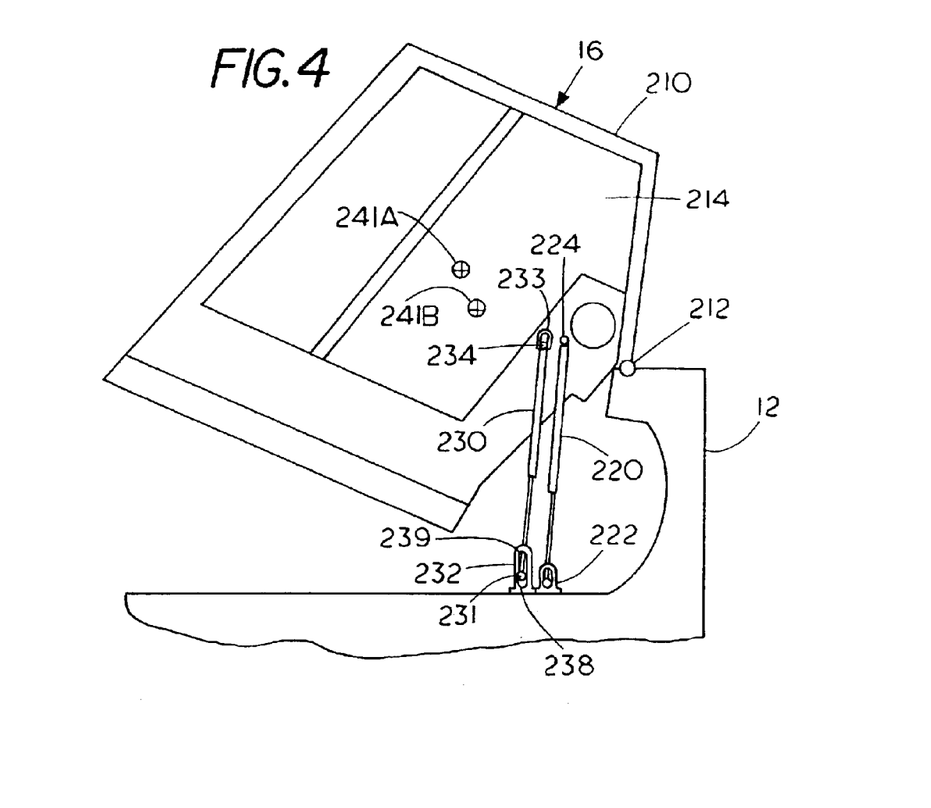
FIG. 4 is a schematic side view of a cab showing the cab opened to a point between the closed position and the release position.

FIG. 4 shows cab frame 210 at a point in the rotation or opening process when none of springs 220, 230, or 240 is fully extended. Springs 220 and 240 are both extending equally and auxiliary spring 230 is providing assisting force as cab frame 210 rotates open about pivot axis 212. Pin 231 remains at bracket slot bottom end 238 to react loads and the expansion force counterbalances the weight of cab 16 including cab frame 210. Springs 220, 230, and 240 work in conjunction with each other to provide a lifting force that counteracts a portion of the weight of cab frame 16.

Figure 5:
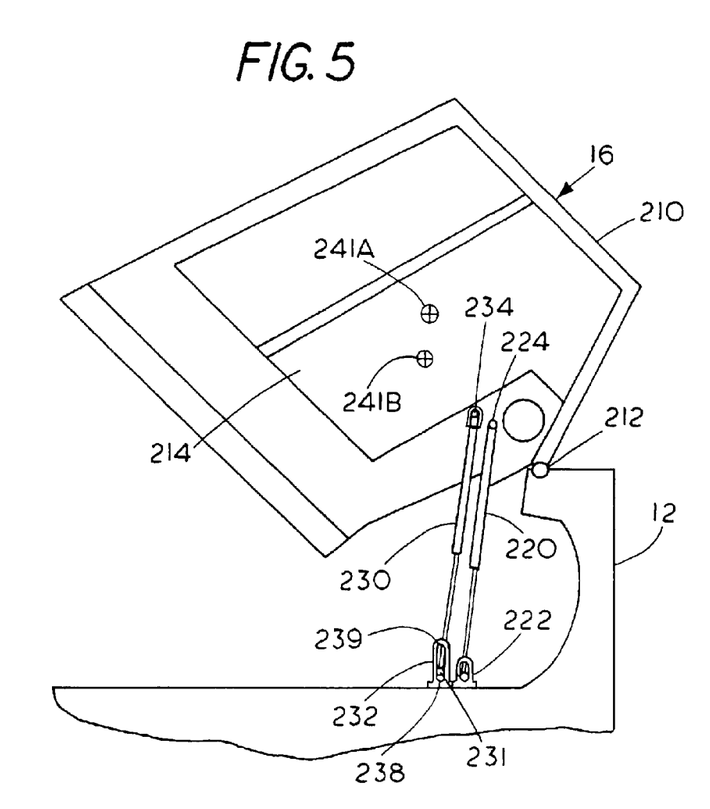
FIG. 5 is a schematic side view of a cab showing the cab opened to the point of maximum extension of an auxiliary spring.

FIG. 5 shows cab frame 210 rotated to a position where auxiliary spring 230 is fully extended. This point is referred to as the "release point" and is after the cab has rotated about 70–75°. At this point, with spring 230 fully extended, pin 231 is still at the bottom end 238 of bracket slot 237 and pin 234 is at the bottom end of the slot in bracket 233. The center of gravity 241A or 241B of cab 16 has moved closer to plane 243 passing through pivot axis 212. The release point may be selected to be at different pivotal positions depending on the configuration of cab 16 and loader 10. It should be noted that while spring 230 is fully extended in FIG. 5, springs 220 and 240 are only partially extended and continue to assist in opening the cab.

Figure 6:
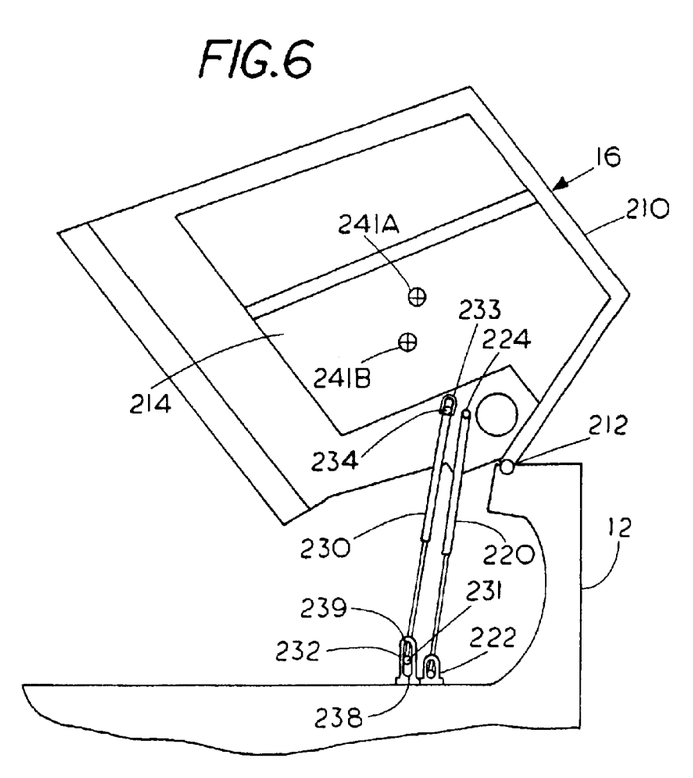
FIG. 6 is a schematic side view that shows the cab opened beyond the position release point shown in FIG. 5.

FIG. 6 shows cab frame 210 rotated slightly beyond the release point shown in FIG. 5. In FIG. 6 spring 230 remains fully extended, but pin 231 has moved from slot bottom end 238 and is sliding in bracket slot 237. This is "lost motion," where the spring 230 does not affect pivoting of cab. In one embodiment spring bracket end 231 releases simply by moving in bracket slot 237 away from bracket bottom end 238. However, other release mechanisms may be used, such as a hinge or other mechanical or static mechanism that allows spring 230 to move with the rotation of cab frame 210 without applying force tending to pivot the cab once spring 230 is fully extended. At this point in the rotation of cab frame 210, only springs 220 and 240 provide a spring force counteracting a portion of the weight of cab 16.

Figure 7:
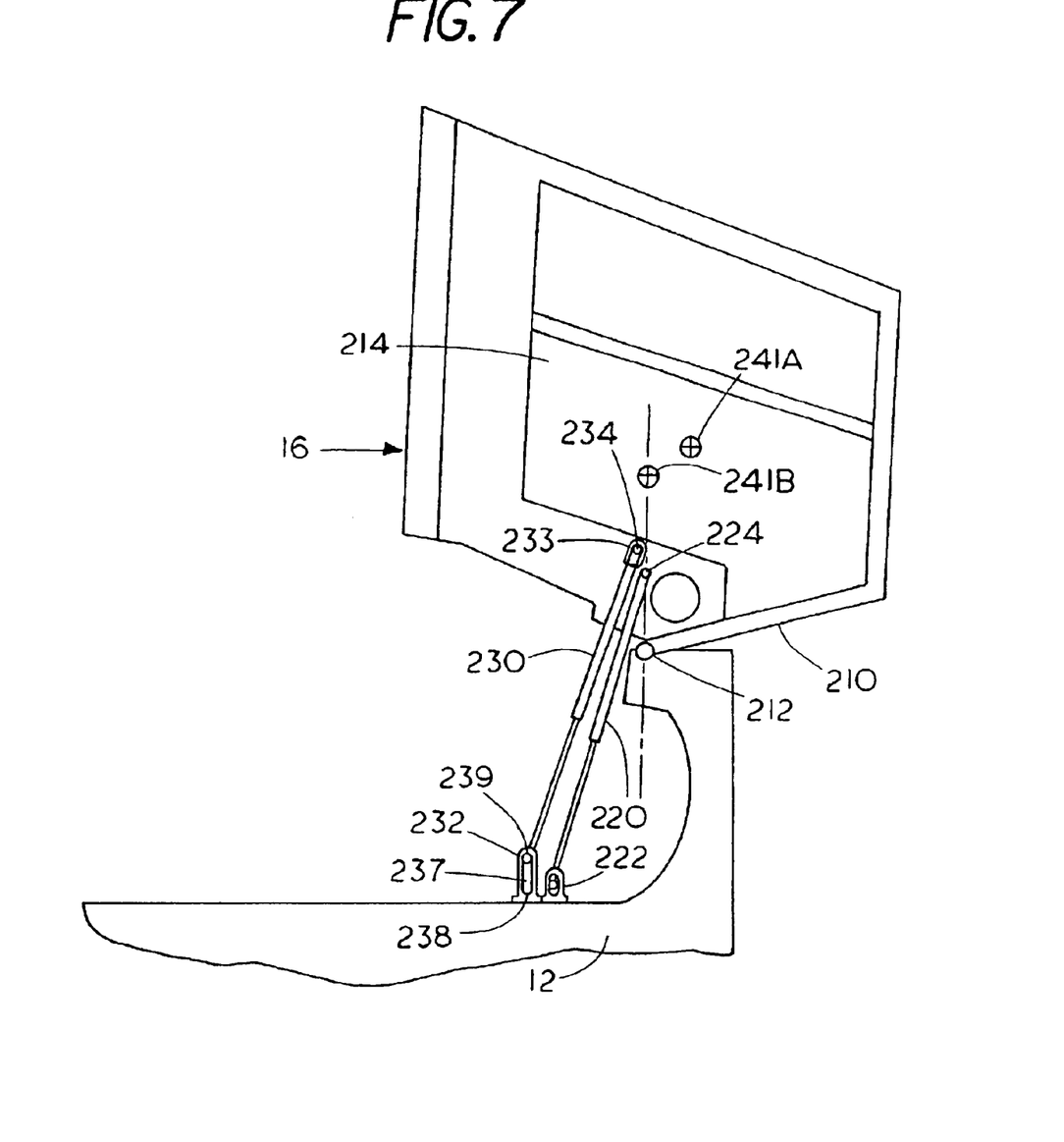
FIG. 7 is a schematic side view showing the cab fully opened.

FIG. 7 shows cab 16 fully opened. When the cab 16 is fully open the center of gravity has moved over center and the cab will continue to pivot clockwise as shown in FIGS. 7 if not restrained. Springs 220, 230, and 240 are all fully extended. Pin 231 has moved within bracket slot 237 to bracket slot top end 239 and pin 234 has slid to the top of bracket 233. Once again, when reaching the on center position, the pins for the springs 220 and 240 in brackets 220 and slide in short slots to the slot upper ends, as well. The latch 240A is engaged to hold the cab open.

When the operator wishes to close cab 16, the latch 240A is released and the process shown and described for opening the cab is reversed. The cab is pivoted manually toward the closed position and springs 220 and 240 move in their bracket slots. Only springs 220 and 240 provide a spring force resisting the closing of cab frame 210 until the moment increases so an operator does not have to overcome high spring loads. Springs 220 and 240 counterbalance the rotation of cab 16 until the cab rotates back to the release point shown in FIG. 5, where the moment tending to close the cab becomes high. The pin 231 reaches the bottom of slot 237, pin 234 reaches the bottom of the slot in bracket 233 and spring 230 again provides an auxiliary spring force resisting the closing of cab frame 210 to counterbalance the high loads from the cab weight.

It is apparent that the lost motion linkage for the auxiliary spring 230 can be provided only on one end of the other of spring 230. In other words, the connection pin 232 could be the only lost motion connection, of the bracket slot. Compression coil springs also can be used, because they can be mounted in a housing that limits the amount of expansion, and provides a minimum and maximum length. Gas springs, that are conventional, however, are now used for assisting in cab rotation, as evidenced by the springs 220 and 240, and are convenient to mount, and are compact.

The use of self-contained springs does not require any power assist, but yet, with the auxiliary spring arrangement shown, the auxiliary spring provides adequate assisting force for initially opening the cab, but does not resist the initial closing movement, so that the amount of force needed to open and close the cab is within the range of manual forces by an operator.

Although the present invention has been described with reference to preferred embodiments, workers skilled in the art will recognize that changes may be made in form and detail without departing from the spirit and scope of the invention.

What is claimed:

1. A power machine having a frame and a cab rotatably coupled to the frame about a pivot axis and movable from a closed position in which a cab's weight acts to provide substantial moments resisting opening movement, to an open position in which the cab center of gravity goes over the pivot axis so the cab continues to tend to rotate from its own weight until stopped, a first spring extendable from a first length to a second longer length coupled between the cab and the frame to provide a force tending to move the cab from the closed position toward the open position, and providing force throughout the pivoting of the cab to a position where the center of gravity is adjacent a vertical plane passing through the pivot axis and an auxiliary spring extendable from a first length to a second longer length coupled between the cab and the frame through a linkage, the auxiliary spring providing an auxiliary force tending to urge the cab to rotate to the open position from the closed position for only a selected portion of the cab rotational movement, wherein the linkage comprises a lost motion linkage having a slot, a pin connecting the auxiliary spring to the linkage through the slot, and the pin sliding in the slot during the portion of pivoting of the cab between the end of the selected portion of the cab rotational movement until the cab reaches the open position.

2. The power machine of claim 1, wherein the first spring exerts force until the cab weight substantially reaches a vertical plane passing through the pivot axis, and the first spring is at a second longer length, the first spring sliding to permit the cab to move to a stopped position from a center position.

3. The power machine of claim 2 wherein the first spring stops movement of the cab after the cab has moved from the center position to the open position.

4. The power machine of claim 2 wherein the selected portion of the rotational movement of the cab, during which the auxiliary spring exerts a force tending to urge the cab to the open position, is in the range of 70° to 75° of rotational movement from the cab's closed position toward the cab's open position.

5. A power machine having a frame and a cab rotatably coupled to the frame at a pivot axis, comprising:
   a first spring, extendable from a first length to a second longer length, coupled to the cab and coupled to the frame;
   a second spring, extendable from a first length to a second longer length, coupled to a second side of the cab opposite from the first spring;
   a third spring, having a first end and a second end, the third spring extendable from a first length to a second longer length, the first end coupled to the second side of the cab at a first mount and the second end coupled to the frame at a second mount;
   wherein the third spring is configured to release when the third spring is extended to the second length and the cab is rotated about the pivot axis;
   wherein the second mount comprises a bracket mounted to the frame, the bracket having a closed slot through which the second end of the third spring is coupled to the bracket; and
   wherein when the third spring is extended to the second length and the cab is rotated about the pivot axis, the second end is moveable within the closed slot.

6. The power machine of claim 5, wherein the springs are gas springs.

7. The power machine of claim 5, wherein the pivot axis is at a rear side of the cab.

8. A power machine comprising:
   a frame;
   an operator compartment formed within the frame;
   a cab covering the operator compartment, the cab rotatably coupled to the frame at a pivot axis such that when an operator moves the cab, the cab rotates about the pivot axis;
   a first and a second assisting means for providing an assisting force during rotation of the cab about the pivot axis, the first and second assisting means each coupled to the frame and to the cab on opposite sides of the cab;
   a third assisting means for providing an auxiliary assisting force during a portion of the rotation of the cab about the pivot axis, the third assisting means coupled to one of the sides of the cab, the third assisting means providing the auxiliary assisting force from between a closed position and a release position; and
   a releasing linkage for releasing the auxiliary assisting force when the cab is at the release position, wherein the releasing linkage comprises a bracket with a slot mounted to the frame and coupled to an end of the third assisting means such that the end of the third assisting means can move within the slot.

9. The power machine of claim 8, wherein the release position is reached prior to a center of gravity of the cab reaching a position directly above the pivot axis.

* * * * *